United States Patent
Takeda et al.

(10) Patent No.: US 11,412,410 B2
(45) Date of Patent: Aug. 9, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 1 day.

(21) Appl. No.: 16/307,528

(22) PCT Filed: Jun. 8, 2017

(86) PCT No.: PCT/JP2017/021322
§ 371 (c)(1),
(2) Date: Dec. 6, 2018

(87) PCT Pub. No.: WO2017/213222
PCT Pub. Date: Dec. 14, 2017

(65) Prior Publication Data
US 2019/0150032 A1 May 16, 2019

(30) Foreign Application Priority Data

Jun. 10, 2016 (JP) .............................. JP2016-116668

(51) Int. Cl.
*H04W 28/06* (2009.01)
*H04W 72/04* (2009.01)
(Continued)

(52) U.S. Cl.
CPC .......... *H04W 28/06* (2013.01); *H04B 7/0626* (2013.01); *H04L 5/0048* (2013.01);
(Continued)

(58) Field of Classification Search
CPC . H04W 72/0453; H04W 88/06; H04W 28/06; H04W 72/04; H04W 72/12;
(Continued)

(56) References Cited

U.S. PATENT DOCUMENTS

| 10,404,443 | B2 * | 9/2019 | Sakhnini | ................... | H04B 1/52 |
| 2012/0300681 | A1 * | 11/2012 | Ji | ........................... | H04W 56/00 370/280 |

(Continued)

FOREIGN PATENT DOCUMENTS

| WO | 2015066645 A1 | 5/2015 |
| WO | 2015/094914 A1 | 6/2015 |

OTHER PUBLICATIONS

Microwave Link, "FDD and TDD Explained," Aug. 27, 2015 https://www.microwave-link.com/microwave/fdd-and-tdd-explained/#:~:text=Time%2Ddivision%20duplexing%20(TDD),traffic%20is%20switched%20in%20time (Year: 2015).*

(Continued)

*Primary Examiner* — Maharishi V Khirodhar
*Assistant Examiner* — Kenneth P Hunt
(74) *Attorney, Agent, or Firm* — Osha Bergman Watanabe & Burton LLP

(57) ABSTRACT

The present invention is designed to maximize the amount of radio resources that can be used in DL, UL or SL in a subframe containing a given DL signal or UL resource. A user terminal has a receiving section that receives downlink control information, and a control section that controls communication by switching between UL communication and DL communication within a subframe based on the downlink control information, and, in a subframe including a signal or a resource in a given communication direction, the control section switches communication in a direction different from the communication direction of the signal or the resource.

5 Claims, 16 Drawing Sheets

(51) Int. Cl.
*H04W 88/06* (2009.01)
*H04L 5/16* (2006.01)
*H04L 5/00* (2006.01)
*H04B 7/06* (2006.01)
*H04W 72/12* (2009.01)
*H04W 72/14* (2009.01)

(52) U.S. Cl.
CPC ............... *H04L 5/16* (2013.01); *H04W 72/04* (2013.01); *H04W 72/0446* (2013.01); *H04W 72/0453* (2013.01); *H04W 72/12* (2013.01); *H04W 72/14* (2013.01); *H04W 88/06* (2013.01); *H04L 5/0007* (2013.01)

(58) Field of Classification Search
CPC ............. H04W 72/14; H04W 72/0446; H04W 72/044; H04W 72/1278; H04W 72/1289; H04W 74/002; H04W 74/006; H04B 7/0626; H04L 5/16; H04L 5/0048; H04L 5/14; H04L 5/1469; H04L 5/22
See application file for complete search history.

(56) References Cited

U.S. PATENT DOCUMENTS

| | | | |
|---|---|---|---|
| 2013/0083736 A1* | 4/2013 | Yin | H04W 72/0446 370/329 |
| 2013/0308610 A1* | 11/2013 | Bergstrom | H04W 56/005 370/336 |
| 2014/0269455 A1* | 9/2014 | Kim | H04B 7/15542 370/280 |
| 2015/0103704 A1* | 4/2015 | Skov | H04W 72/0446 370/280 |
| 2015/0109969 A1* | 4/2015 | Celebi | H04L 5/0073 370/278 |
| 2015/0181575 A1 | 6/2015 | Ng et al. | |
| 2016/0119948 A1* | 4/2016 | Damnjanovic | H04W 72/14 370/280 |
| 2016/0226650 A1* | 8/2016 | Chen | H04L 5/14 |
| 2016/0330011 A1* | 11/2016 | Lee | H04L 5/006 |
| 2018/0213531 A1* | 7/2018 | Kim | H04W 72/0446 |
| 2018/0220360 A1* | 8/2018 | Sheng | H04L 27/2613 |
| 2018/0295220 A1* | 10/2018 | Ren | H04L 69/324 |
| 2019/0158263 A1 | 5/2019 | Lee et al. | |

OTHER PUBLICATIONS

International Search Report issued in PCT/JP2017/021322 dated Aug. 29, 2017 (1 page).
NTT DOCOMO, Inc.; "Discussion on frame structure for NR"; 3GPP TSG RAN WG1 Meeting #85, R1-165176; Nanjing, P.R. China; May 23-27, 2016 (10 pages).
3GPP TS 36.300 V12.4.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
English Translation of Written Opinion of the International Searching Authority issued in PCT/JP2017/021322 dated Aug. 29, 2017 (5 pages).
Extended European Search Report issued in European Application No. 17810395.8, dated Dec. 19, 2019 (7 pages).
3GPP TSG RAN WG1 Meeting #84bis; R1-163112 "Initial views on frame structure for NR access technology" NTT DOCOMO, Inc.; Busan, Korea; Apr. 11-15, 2016 (8 pages).
Office Action issued in the counterpart European Patent Application No. 17810395.8, dated Mar. 29, 2021 (6 pages).
NTT DOCOMO, Inc.; "Discussion on frame structure for NR"; 3GPP TSG RAN WG1 Meeting #85, R1-165176 Nanjing, P. R. China, May 23-27, 2016 (9 pages).
Nokia, Alcatel-Lucent Shanghai Bell; "Basic frame structure principles for 5G"; 3GPP TSG-RAN WG1#85, R1-165027 Nanjing, P.R. China, May 23-27, 2016 (6 pages).
3GPP TSG RAN WG1 Meeting #85; R1-164333 "Discussion on flexible/dynamic TDD" Fujitsu; Nanjing, China; May 23-27, 2016 (6 pages).
3GPP TSG RAN WG1 Meeting #85; R1-164331 "TDD frame structure with mixed numerology" Fujitsu; Nanjing, China; May 23-27, 2016 (5 pages).
3GPP TSG-RAN WG1 #85; R1-165456 "Summary of email discussion on frame structure" Qualcomm Incorporated; Nanjing, China; May 23-27, 2016 (28 pages).
Office Action issued in Japanese Application No. 2018-521775; dated Sep. 7, 2021 (6 pages).
Office Action issued in Chinese Application No. 201780035598.X dated Oct. 22, 2021 (14 pages).
Office Action issued in Japanese Application No. 2018-521775; dated Jan. 5, 2022 (6 pages).
Office Action issued in Chinese Application No. 201780035598.X dated Mar. 29, 2022 (16 pages).

* cited by examiner

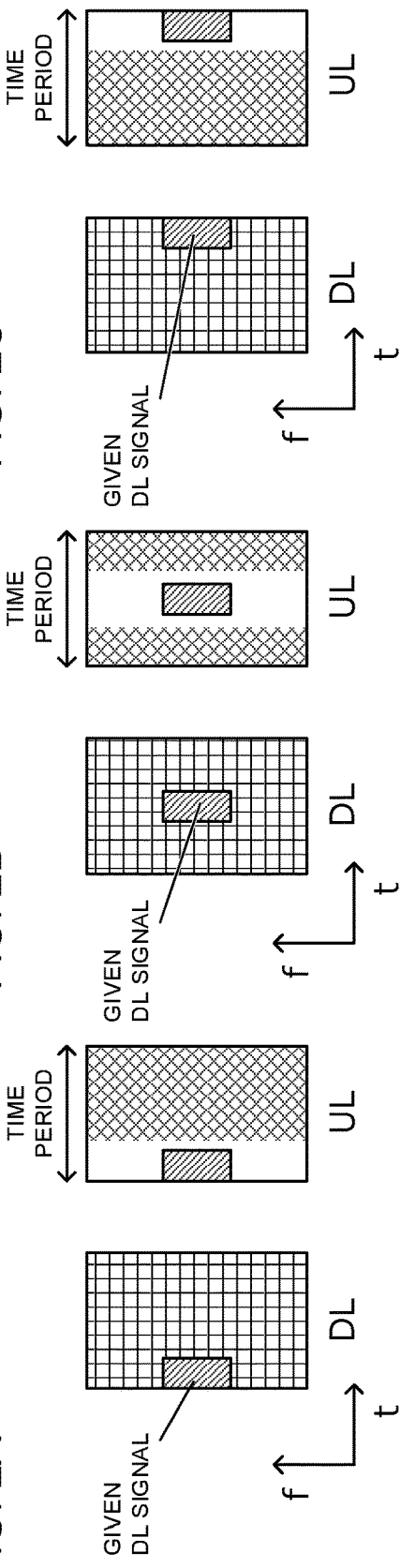
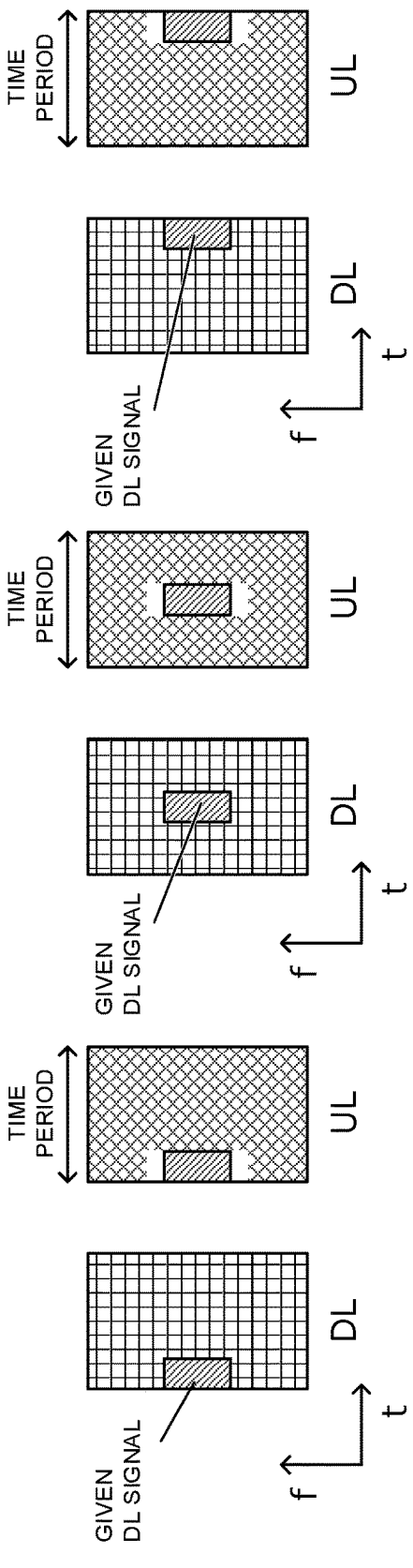

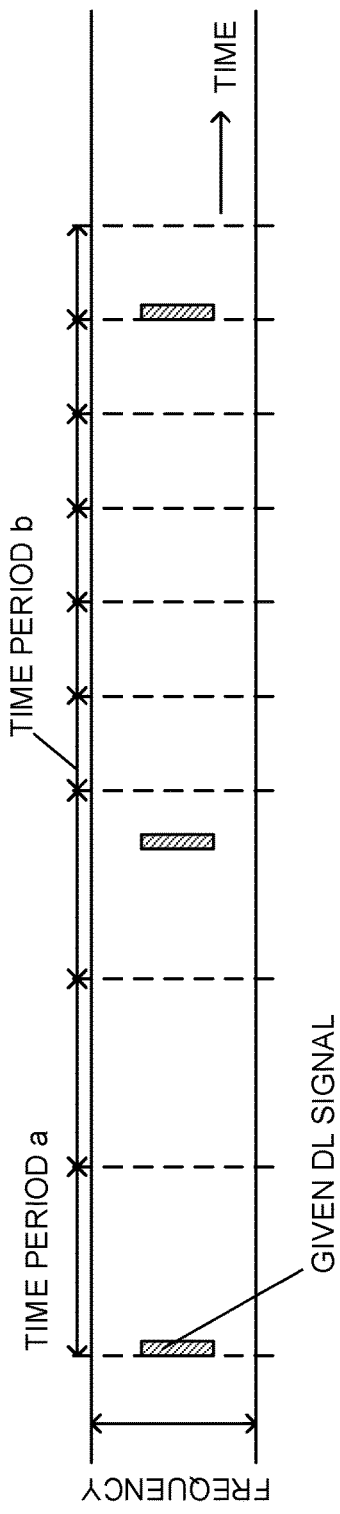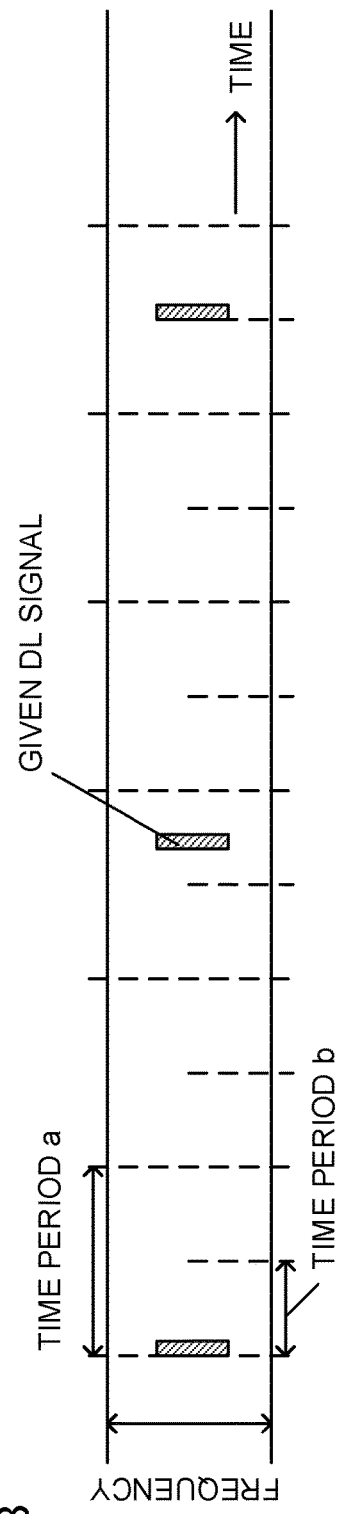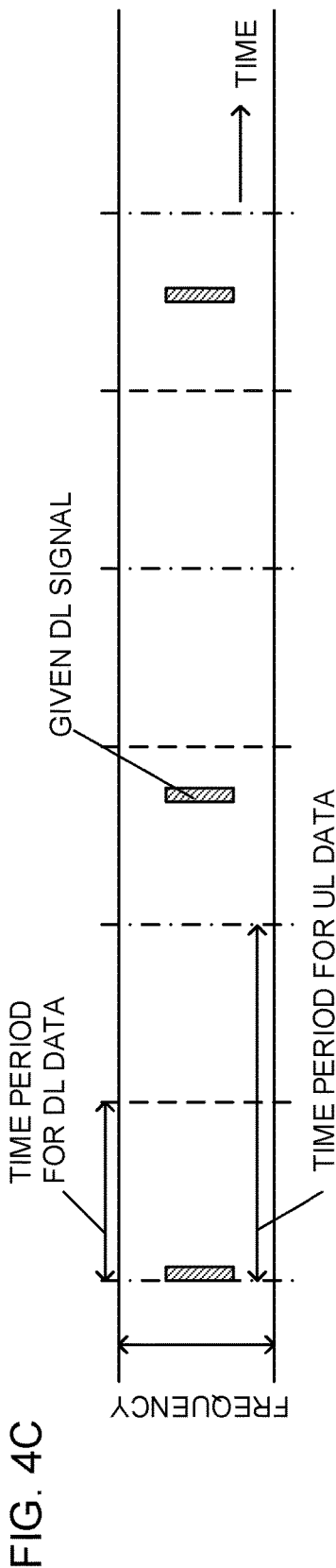

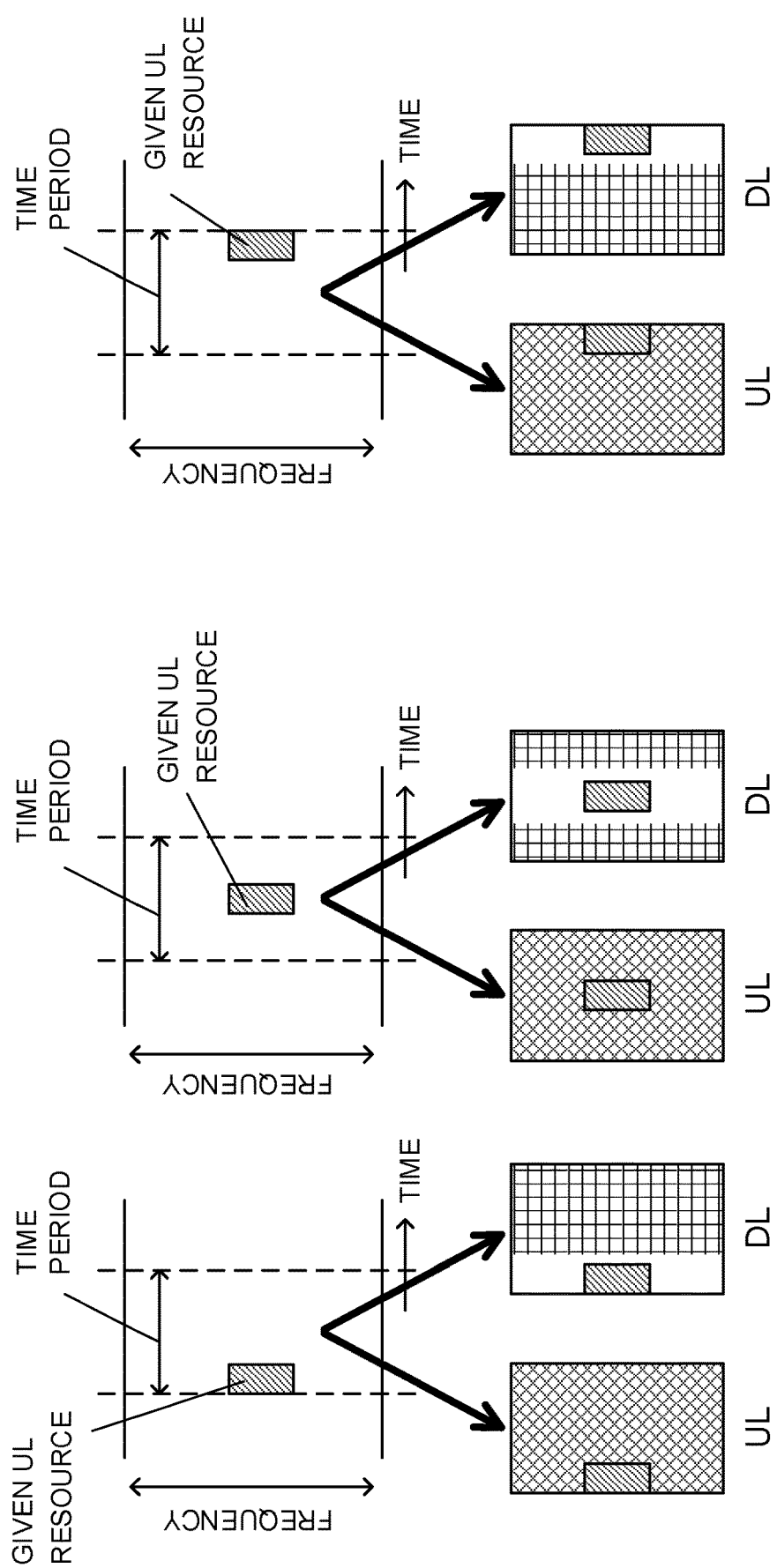

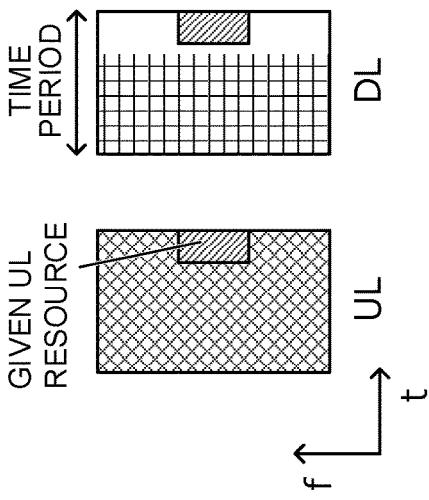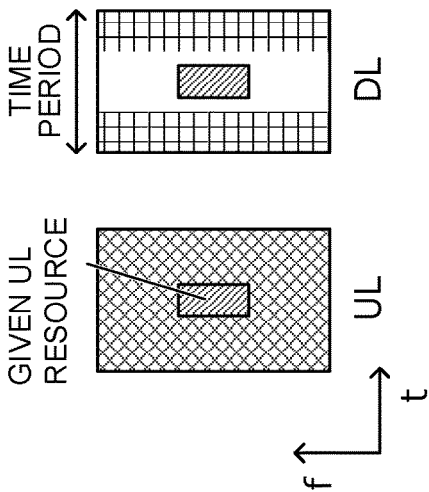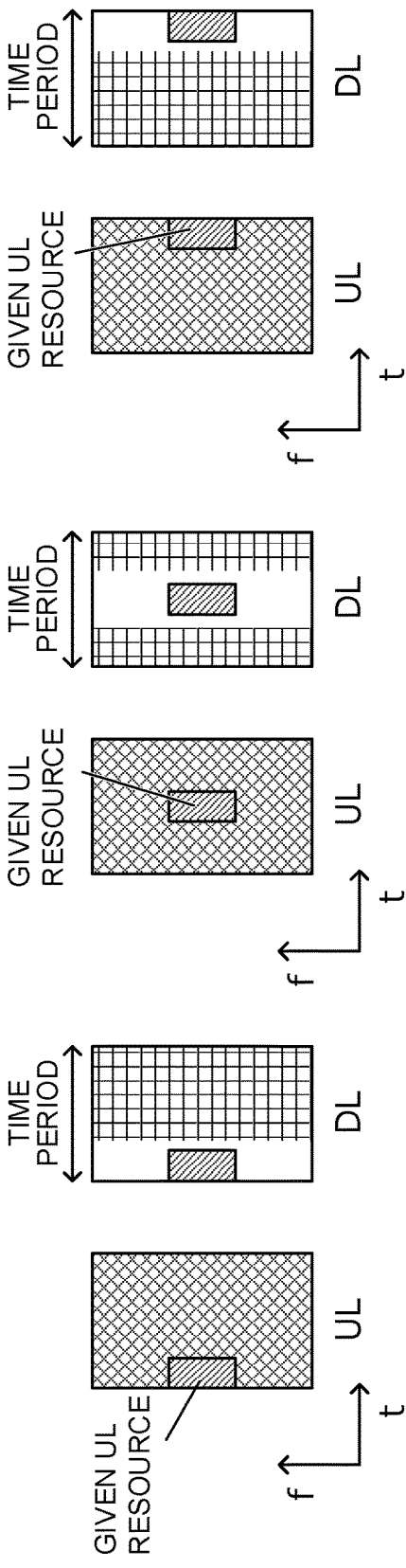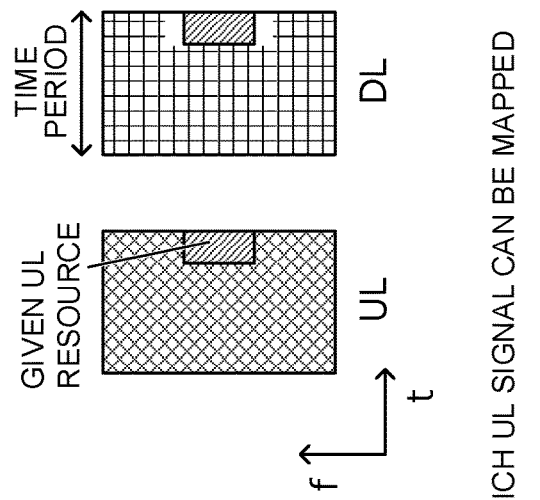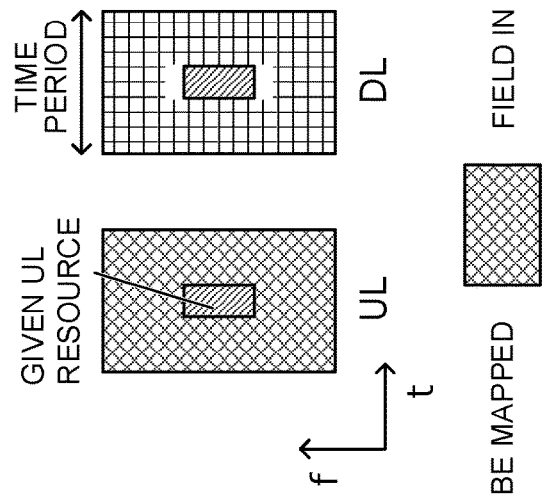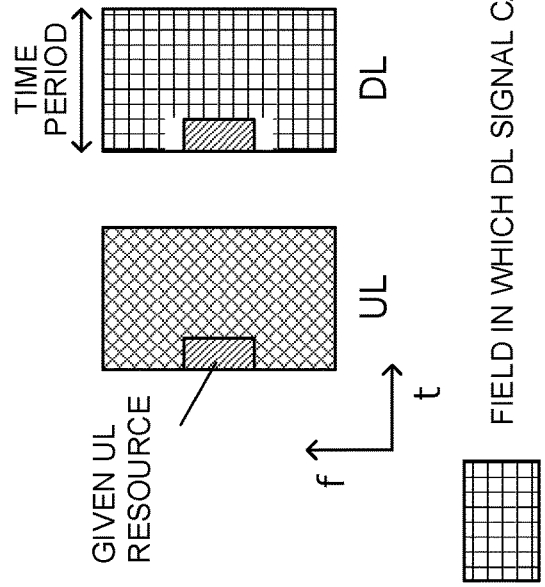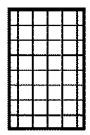

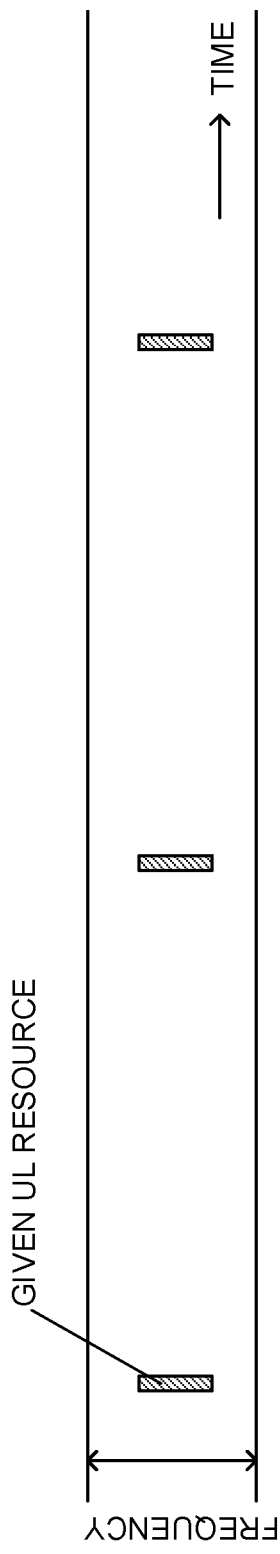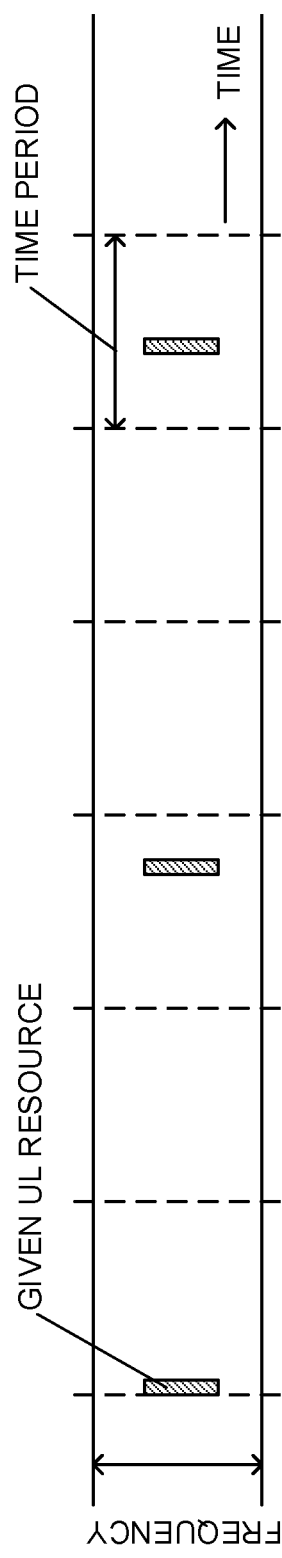

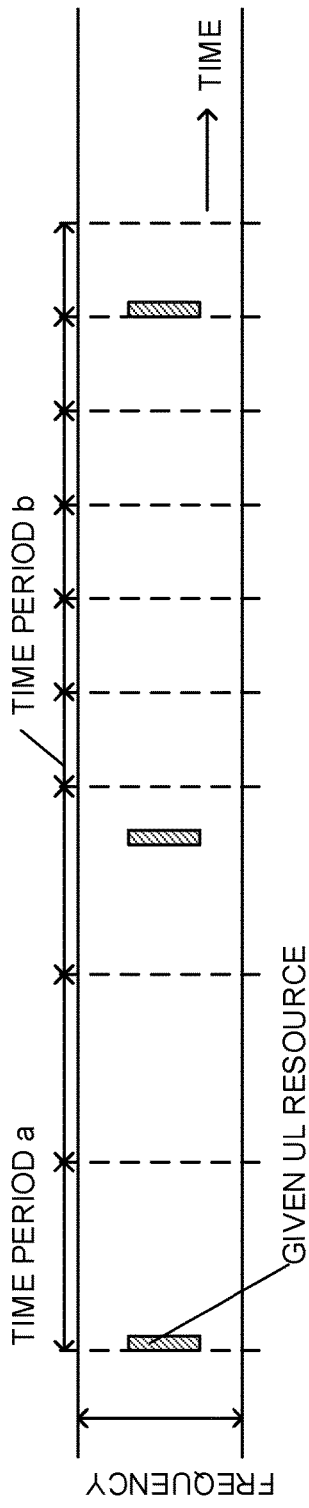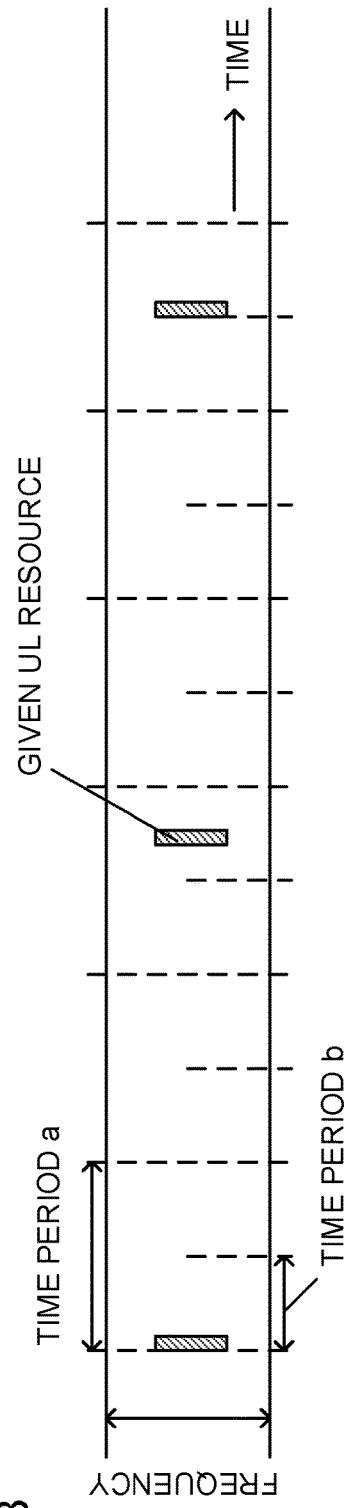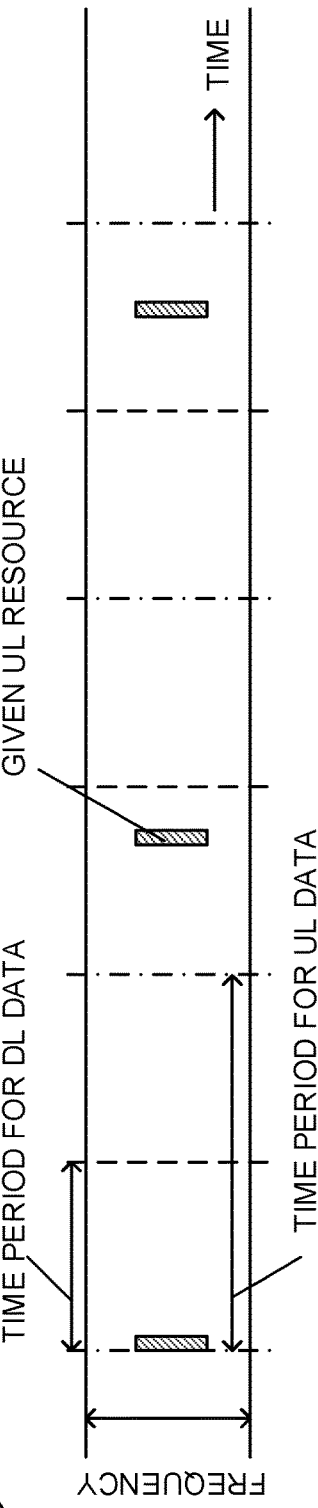

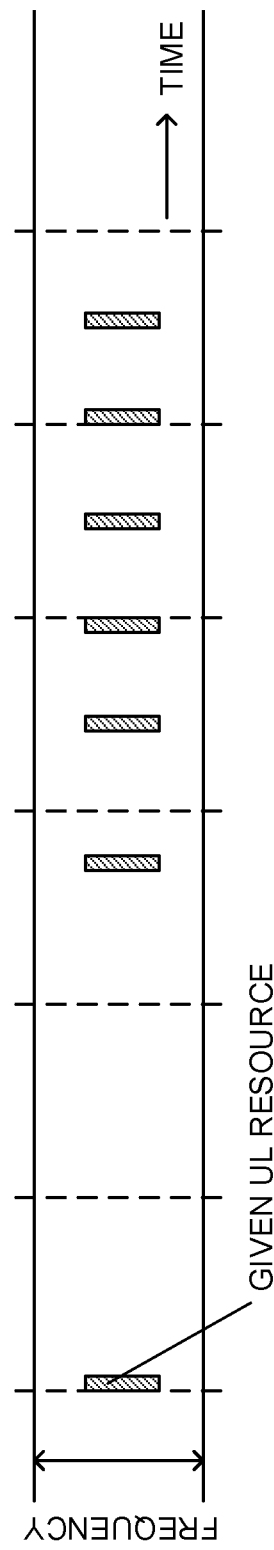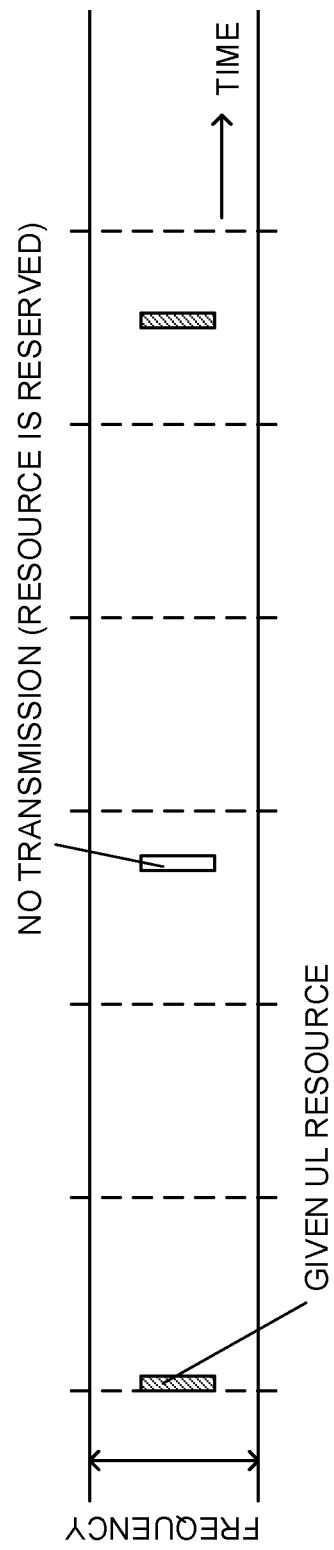

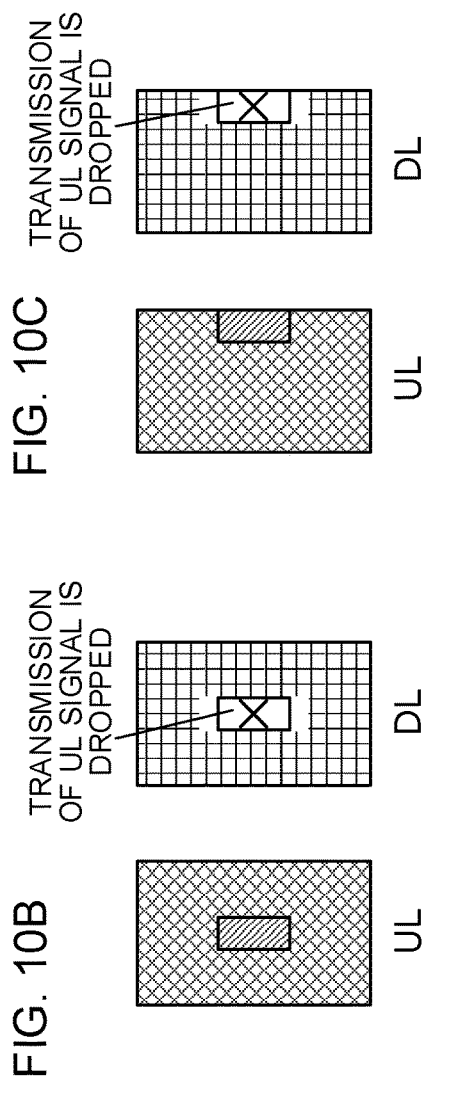
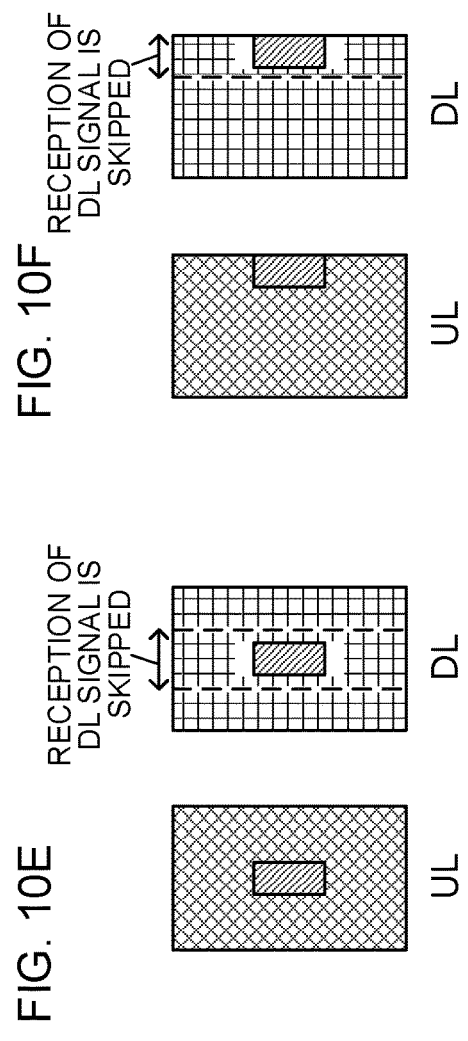

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). Successor systems of LTE (referred to as, for example, "LTE-A (LTE-Advanced)," "FRA (Future Radio Access)," "5G (5th generation mobile communication system)" and so on) are also under study for the purpose of achieving further broadbandization and increased speed beyond LTE.

Existing LTE systems use control based on TDD (Time Division Duplex) and FDD (Frequency Division Duplex). For example, in TDD, whether to use each subframe in the uplink (UL) or in the downlink (DL) is determined strictly based on UL/DL configurations.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Generally speaking, traffic ratios of UL and DL and a side link (SL (Side link, communication between terminal and terminal)) are not always constant, but vary over time or between locations. For this reason, radio communication systems that use TDD are expected to use radio resources efficiently, by dynamically changing the UL, DL resource format in a given cell (a transmission point, a radio base station, etc.) in accordance with the variation of traffic.

In the radio communication systems of LTE Rel. 13 or later versions (for example, 5G), radio frames (lean radio frame) that have good future scalability and that achieve excellent power saving performance are under study. Such a radio frame is also referred to as "lean radio frame (Lean radio frame)." Unlike existing LTE systems, in which predetermined UL/DL configurations are used, regarding these radio frames, studies are in progress to make it possible to change the direction of communication such as UL and DL, dynamically (this scheme is also referred to as "highly flexible dynamic TDD").

Since DL signals such as synchronization signals and broadcast information and UL signals such as random access preambles are important signals for initial access, so that it is preferable if their resources are configured in a given periodicity—that is, if these signals can be transmitted/received in a given periodicity. However, if the direction of communication of subframes including these given DL signals, transmitted and received in a given periodicity, is fixed to DL, or if the direction of communication of subframes including UL resources for transmitting given UL signal is fixed to UL, the communication direction cannot be flexibly changed and used in these subframes, and the amount of radio resources that can be used may be restricted.

The present invention has been made in view of the above, and it is therefore an object of the present invention to provide a user terminal and a radio communication method that can maximize the amount of radio resources that can be used in DL, UL or SL in subframes including a given DL signal or UL resource.

Solution to Problem

According to the present invention, a user terminal has a receiving section that receives downlink control information, and a control section that controls communication by switching between UL communication and DL communication within a subframe based on the downlink control information, and, in a subframe including a signal or a resource in a given communication direction, the control section switches communication in a direction different from the communication direction of the signal or the resource.

Advantageous Effects of Invention

According to the present invention, in a subframe including a given DL signal or UL resource, the amount of radio resources that can be used in DL, UL or SL can be maximized.

BRIEF DESCRIPTION OF DRAWINGS

FIGS. 2A to 2C are diagrams to show examples in which radio resources other than a given DL signal are used in the DL/UL/SL in the time intervals shown in FIG. 1 when the base station operates in half-duplex operation, and FIGS. 2D to 2F are diagrams to show examples in which radio resources other than a given DL signal are used in the DL/UL/SL in the time intervals shown in FIG. 1 when the base station operates in full-duplex operation;

FIG. 4A is a diagram to show an example in which a time interval can be changed, FIG. 4B is a diagram to show an example in which the time interval differs per partial band in a system band, and FIG. 4C is a diagram to show an example in which the time interval changes between UL and DL;

FIG. 5A is a diagram to show an example in which a given UL resource is included in an OFDM symbol located early in a time interval, FIG. 5B is a diagram to show an example where a given UL resource is included in a OFDM symbol located in the center of a time interval, and FIG. 5C is a diagram to show an example in which a given UL resource is included in an OFDM symbol located late in a time interval;

FIGS. 6A to 6C are diagrams to show examples, in which radio resources other than a given UL resource are used in the DL/UL/SL in the time interval shown in FIG. 5 when the base station operates in half-duplex operation, and FIGS. 6D to 6F are diagrams to show examples, radio resources other than a given UL resource are used in the DL/UL/SL in the time intervals shown in FIG. 5 when the base station operates in full-duplex operation;

FIG. 7A is a diagram to show an example in which a given UL resource is configured for given UL signal transmission, and FIG. 7B is a diagram to show the relationship between a given UL resource and a time interval;

FIG. 8A is a diagram to show an example in which a time interval can be changed, FIG. 8B is a diagram to show an example where the time interval differs for each subband in a system band, and FIG. 8C is a diagram to show an example in which the time interval changes between UL and DL;

FIG. 9A is a diagram to show an example in which a given UL resource can be changed, and FIG. 9B is a diagram to show an example in which a given UL signal is transmitted when a given condition is fulfilled;

FIGS. 10A to 10C are diagrams to show examples of dropping transmission of UL signals, and FIGS. 10D to 10F are diagrams to show examples of skipping receipt of a DL signal;

DESCRIPTION OF EMBODIMENTS

Now, an embodiment of the present invention will be described in detail below with reference to the accompanying drawings. Given the radio frame configurations of LTE Rel. 13 and later radio communication systems (for example 5G), the present inventors have found out a configuration that allows a DL, UL or SL data channel, control channel or reference signal (RS) to be scheduled in a time interval (period, subframe) where a given DL signal such as a synchronization signal or a broadcast channel, or a UL resource for transmitting a given UL signal such as a random access preamble or a scheduling request signal is allocated.

(First Aspect)

In the first aspect, a structure will be described where, when a given DL signal is transmitted and received in a given periodicity, a DL, UL or SL data channel, control channel or reference signal (RS) can be scheduled in a time interval (subframe) where the given DL signal is included. The given DL signal refers to, for example, a synchronization signal, a broadcast channel, system information, a DL control channel for transmitting scheduling control information, or a DL signal scheduled aperiodically by physical layer signaling, such as a quality measurement reference signal, a reference signal for use for data and its demodulation, and a DL signals other than aperiodic CSI-RS (Channel State Information RS).

Figure 1A:
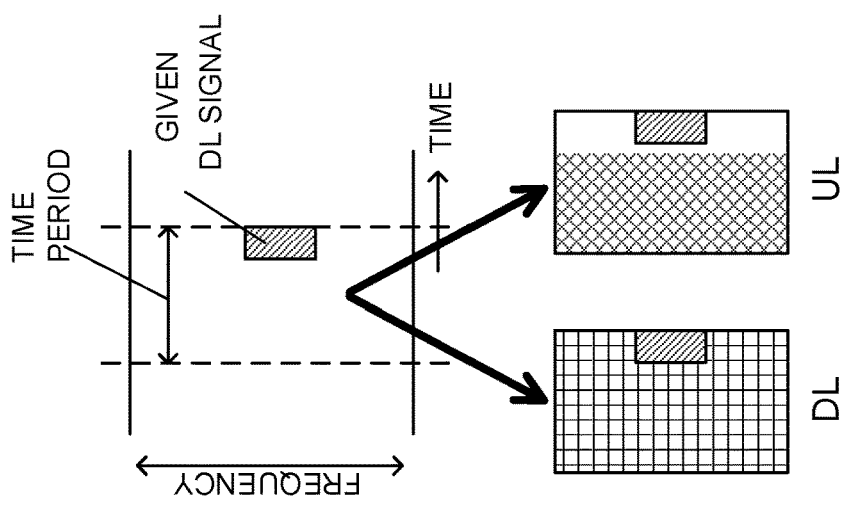
FIG. 1A is a diagram to show an example in which a given DL signal is included in an OFDM symbol located early in a time interval.
Figure 1B:
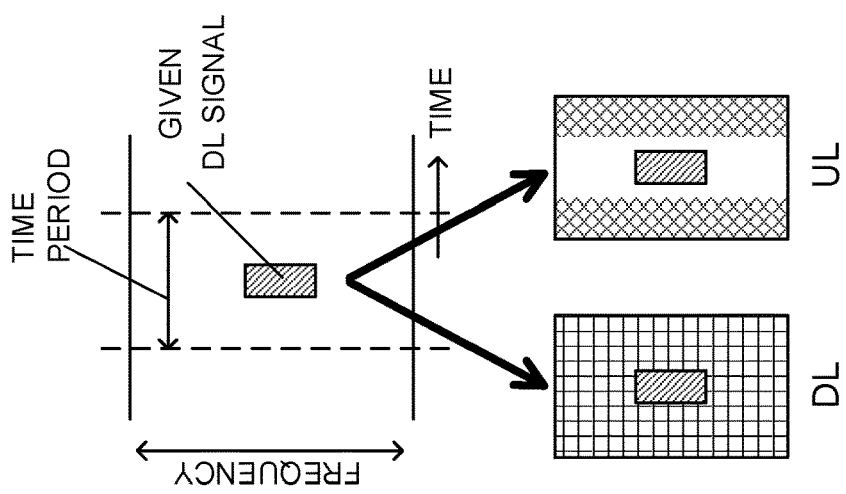
FIG. 1B is a diagram to show an example in which a given DL signal is included in an OFDM symbol located in the center of a time interval.
Figure 1C:
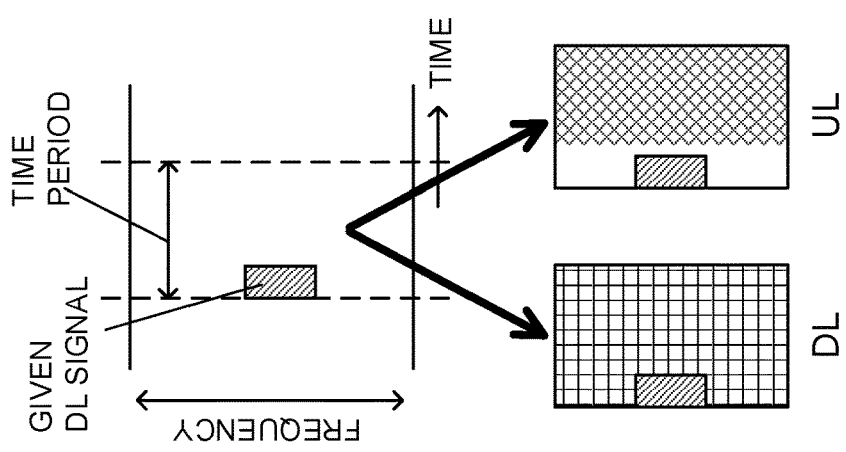
FIG. 1C is a diagram to show an example in which a given DL signal is included in an OFDM symbol located late in a time interval.

FIG. 1 are diagrams to show examples of a time interval (subframe) in which a given DL signal is included transmitted/received in a given periodicity. The given DL signal may be included in any OFDM (Orthogonal Frequency Division Multiplexing) symbol in the time interval (subframe). FIG. 1A shows an example in which a given DL signal is included in an OFDM symbol located early in the time interval (subframe), FIG. 1B shows an example in which a given DL signal is included in an OFDM symbol located in the center of the time interval (subframe), and FIG. 1C shows an example in which a given DL signal is included in an OFDM symbol located late in the time interval (subframe).

In existing LTE systems (LTE Rel. 8 to 12), one subframe is 1 [ms] long, and a TTI (Transmission Time Interval), which is the minimum time unit of scheduling, is one subframe. Meanwhile, subframes in a lean radio frame can be made shorter than 1 [ms] long. In this case, subframes in a lean radio frame may be referred to as "short TTIs" "short subframes," and so on. Alternatively, subframes in a lean radio frame can be 1 [ms] long, like subframes of existing LTE systems. In this case, subframes in a lean radio frame may be referred to as "normal TTIs," "long TTIs" and so on.

In the present embodiment, in the time intervals (subframes) shown in FIGS. 1A to 1C, radio resources other than the radio resource elements where a given DL signal is mapped can be flexibly used in, for example, DL data communication, UL data communication, or sidelink (SL) data receipt or data transmission in inter-terminal communication (D2D (Device-to-Device)), in which signals are transmitted/received between user terminals. In this specification, when "DL communication" is simply mentioned, this may include SL receipt. Likewise, when simply "UL communication" is mentioned, this may include SL transmission. Also, in this specification, when "DL data communication" or "DL data" is mentioned, this may refer to downlink signals scheduled aperiodically by physical layer signaling, such as, for example, DL data and its demodulation reference signal, the aperiodic CSI-RS, and so on. Also, in this specification, when "UL data communication" or "UL data" is mentioned, this may refer to uplink signals scheduled aperiodically by physical layer signaling, such as for example, UL data and its demodulation reference signal, the aperiodic sounding reference signal (SRS) and so on.

FIG. 2 are diagrams to show examples where, in the time interval (subframe) shown in FIG. 1, radio resources other than the radio resource elements where a given DL signal is mapped are used for DL communication or UL communication. FIGS. 2A and 2D are examples in which a given DL signal is included in an OFDM symbol located early in the time interval (subframe), FIGS. 2B and 2E are examples in which a given DL signal is included in an OFDM symbol located in the center of the time interval (subframe), and FIGS. 2C and 2F are examples in which a given DL signal is included in an OFDM symbol located late in the time interval (subframe).

FIGS. 2A to 2C show examples in which the base station (or an SL terminal that transmits a given DL signal, in the event of SL) operates in half-duplex operation. When performing DL communication in a time interval (subframe) in which a given DL signal is included, the base station can map DL data to radio resources, except for the radio resource elements where this given DL signal is mapped. On the other hand, when performing UL communication in a time interval (subframe) in which a given DL signal is included, in the OFDM symbol including this given DL signal and in OFDM symbols where a gap period or a guard period is provided, the base station (or an SL transmission terminal in the event of SL) does not map UL data to all the subcarriers of the same carrier. The gap period or the guard period is provided in OFDM symbols before and after the OFDM symbol where the given DL signal is allocated.

Note that a user terminal to transmit UL data may encode data, considering resources around the given DL signal where UL data is not mapped (rate matching), or the user terminal may encode data regardless of the resources around the given DL signal where UL data is not mapped and puncture codeword bits to match resources where data cannot be mapped (puncturing). When performing rate matching, it is possible to avoid performance degradation due to the inability to map UL data. When puncturing is executed, a common coding control can be applied between subframes including the given DL signal and subframes not including this given DL signal, so that the burden of control on the terminal can be reduced.

FIG. 2D to 2F show examples in which the base station (or an SL terminal that transmits a given DL signal, in the event of SL) operates in full-duplex operation. When performing DL communication in a time interval (subframe) in which a given DL signal is included, the base station can map DL data to radio resources, except for the radio resource elements where this given DL signal is mapped. On the other hand, when performing UL communication in a time interval (subframe) in which a given DL signal is included, the base station can map UL data even in OFDM symbols where this DL signal is included, except for the guard period. The guard period is provided in adjacent subcarriers of the given DL signal, and, for example, comprised of one or a plurality of subcarriers, or one or a plurality of resource blocks.

Note that a user terminal to transmit UL data may encode data, considering resources around the given DL signal where UL data is not mapped (rate matching), or the user terminal may encode data without considering resources around the given DL signal where UL data is not mapped, and puncture codeword bits to match resources where data cannot be mapped (puncturing). When performing rate matching, it is possible to avoid degradation in performance due to the inability to map UL data. When performing puncturing, common coding control can be applied between subframes including this given DL signal and subframes not including the given DL signal, so that the burden of control on the terminal can be reduced.

Figure 3A:
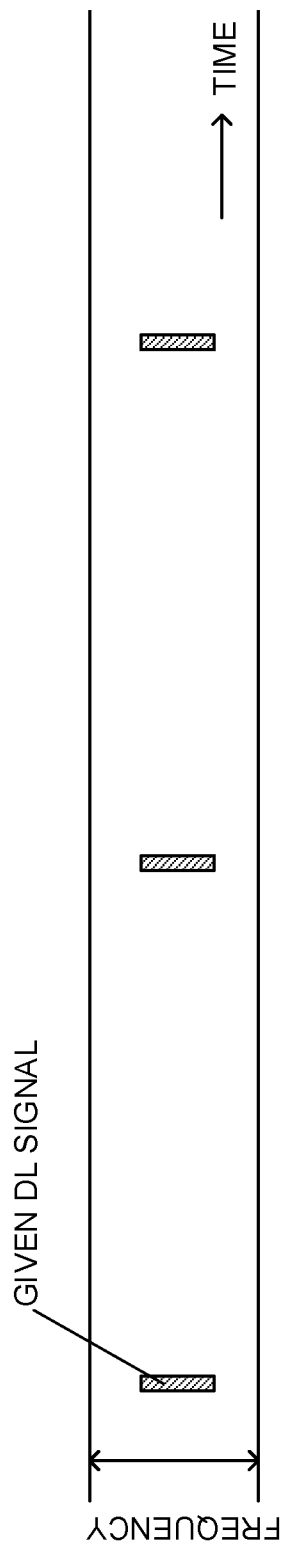
FIG. 3A is a diagram to show an example in which a given DL signal is transmitted in a given periodicity.
Figure 3B:
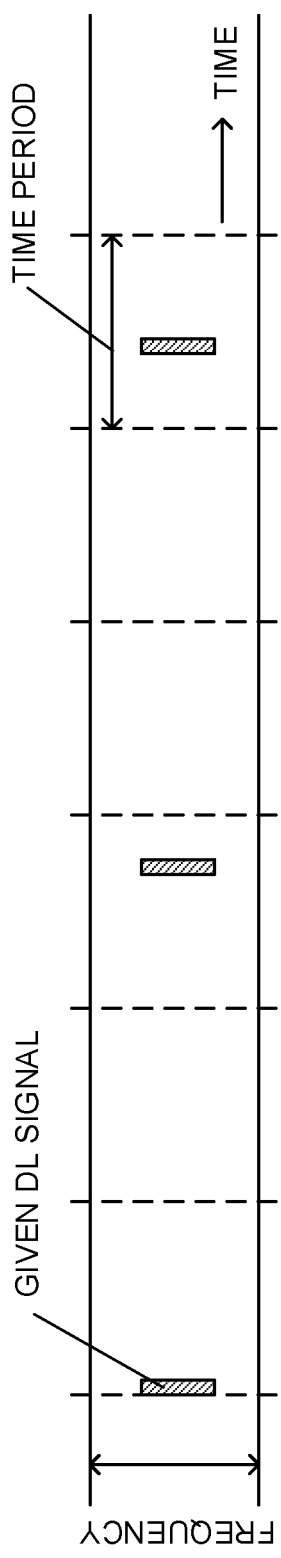
FIG. 3B is a diagram to show the relationship between a given DL signal and a time interval.

In the radio communication system of the present embodiment, as shown in FIG. 3A, a given DL signal is transmitted in a given periodicity. Based on this given DL signal, the user terminal can obtain information necessary for starting communication, measure the quality of communication, and so on. Based on radio parameters, commands from the base station and so on, the user terminal identify the time interval duration and its timing (for example, a subframe duration) for data communication as shown in FIG. 3B. The radio parameters may include the subcarrier spacing for use in data communication. The radio parameters may be 1 [ms] or 0.5 [ms] when the subcarrier spacing is 15 [kHz], and may be 0.5 [ms] or 0.25 [ms] when the subcarrier spacing is 30 [kHz].

The length of the time interval (subframe) and the starting timing (that is, the boundary between adjacent time intervals) may be provided independently of the transmission/ receipt periodicity of the given DL signal. The time interval (subframe) may be changed by RRC (Radio Resource Control), MAC (Medium Access Control) or physical layer signaling. FIG. 4A is a diagram to show an example in which the time interval has been changed from time interval "a" to time interval "b." For example, the time interval a may be a long TTI and the time interval b may be a shortened TTI.

The time interval (subframe) may be different for each partial band (subband) in which DL data or UL data is scheduled or each partial band (subband) to which scheduling control information is mapped, in the system band. FIG. 4B is a diagram to show an example in which the time interval changes between time interval a and time interval b for each partial band (subband) in the system band. For example, the time interval a may be a long TTI and the time interval b may be a shortened TTI.

As for the time interval (subframe), the time interval (subframe) for DL communication and the time interval (subframe) for UL communication may be different. FIG. 4C is a diagram to show an example in which the time interval for DL communication is different from the time interval for UL communication. In the example shown in FIG. 4C, the length of the time interval for UL communication is about twice the length of the time interval for DL communication.

Regardless of whether a given DL signal is included in a time interval (subframe) or not, when DL data or UL data is scheduled in this time interval, the user terminal transmits and receives signals scheduled in this time interval.

When DL data is scheduled in a time interval (subframe), the user terminal performs receipt on the assumption that the signal are mapped except for the radio resource elements where the given DL signal is mapped. That is, the user terminal maps DL data without providing a gap period or a guard period.

When UL data is scheduled in a time interval (subframe), the user terminal maps the signal apart from the radio resource elements where a given DL signal is mapped and part of their surrounding resource elements and transmits this signal. That is, a gap period and/or a guard period are provided when UL data is mapped.

The rule for mapping UL data in a time interval (subframe) in which a given DL signal is included may vary depending on whether the base station (or, in the event of SL, an SL terminal that transmits a given DL signal) operates in half-duplex operation or in full-duplex operation. When the base station operates in half-duplex operation, in an OFDM symbol in which a given DL signal is included a rule that UL data is not mapped to all subcarriers of the same carrier (the carrier where the given DL signal is transmitted) may be used (see FIGS. 2A to 2C). When the base station operates in full-duplex operation, even in an OFDM symbol in which a given DL signal is included, a rule that UL data is mapped except for adjacent subcarriers of the given DL signal may be used (see FIGS. 2D to 2F).

In each time interval (subframe), whether DL data or UL data is scheduled may be reported to the user terminal via higher layer or physical layer signaling.

Whether the base station operates in half-duplex operation or in full-duplex operation may be separately reported to the user terminal via higher layer signaling and so on. In the absence of a report in particular, the user terminal may map the UL data on the assumption that the base station operates in half-duplex operation.

When it is assumed that the base station operates in half-duplex operation and UL data is mapped in a time interval (subframe) in which a given DL signal is included— that is, in the cases shown in FIGS. 2A to 2C—the user terminal can receive the given DL signal included in this time interval. In this case, by receiving this given DL signal, it is possible to maintain downlink synchronization and perform quality measurement, so that high quality connection can be maintained.

When it is assumed that the base station operates in full-duplex operation and UL data is mapped in a time interval (subframe) in which a given DL signal is included—that is, in the case shown in FIGS. 2D to 2F—the user terminal may skip receipt of the given DL signal included in this time interval. In this case, in the OFDM symbol where this given DL signal is mapped, the user terminal does not need to receive the given DL signal and transmit UL data at the same time, so that the burden of implementation can be reduced, and the increase in cost can be suppressed. When it is assumed that the base station operates in full-duplex operation, the user terminal may always skip receiving this given DL signal, or the user terminal may separately decide whether to map UL data to an OFDM symbol where the given DL signal is mapped and skip receipt of the given DL signal, or to receive the given DL signal without mapping UL data to the OFDM symbol where the given DL signal is mapped, based on commands from the base station in physical layer or higher layer signaling.

According to the first aspect, when a given DL signal is transmitted/received in a given periodicity, radio resources in time intervals (subframes) where this given DL signal is included can be flexibly used for DL data communication, UL data communication or SL data communication. As a result of this, the time intervals (subframe) where the given DL signal is included can be used for data communication in an arbitrary communication directions including DL, UL or SL.

(Second Aspect)

In the second aspect, a configuration, whereby a DL, UL or SL data channel, control channel or reference signal (RS) can be scheduled in a time interval (subframe) including a UL resource for transmitting a given UL signal, will be explained. The given UL signal refers to a UL signal other than UL signals scheduled aperiodically with physical layer signaling, such as, for example, random access preambles, scheduling request signals (SR (Scheduling Request)), CSI feedback, HARQ-ACK (Hybrid Automatic Repeat Request Acknowledge) feedback, sounding reference signals (SRS), or reference signals for beam measurement (UL BRS (UL Beam-specific RS) or BRRS (beam-refinement RS)), for example data and reference signal used for demodulation of that data, and aperiodic SRS (Sounding RS).

FIG. 5 are diagrams to show examples of time intervals (subframes) including a UL resource for transmitting a given UL signal. The given UL resource may be included in any OFDM symbol in the time interval (subframe). FIG. 5A shows an example in which a given UL resource is included in an OFDM symbol located early in the time interval (subframe), FIG. 5B shows an example in which a given UL resource is included in an OFDM symbol located in the center of the time interval (subframe), FIG. 5C shows an example in which a given UL resource is included in an OFDM symbol located late in the time interval (subframe).

In the present embodiment, in the time intervals (subframes) shown in FIGS. 5A to 5C, radio resources other than the radio resource elements where a given UL resource is mapped can be flexibly used for DL data communication, UL data communication, SL data communication or transmission and receipt of aperiodic reference signals.

FIG. 6 are diagrams to show examples in which radio resources other than the radio resource elements where a given UL resource is mapped are used for DL communication or UL communication in the time interval (subframe) shown in FIG. 5. FIGS. 6A and 6D are examples in which a given UL resource is included in an OFDM symbol located early in the time interval (subframe), FIGS. 6B and 6E are examples in which a given UL resource is included in an OFDM symbol located in the center of the time interval (subframe), FIGS. 6C and 6F are examples in which a given UL resource is included in an OFDM symbol located late in the time interval (subframe).

FIGS. 6A to 6C show examples in which the base station (or an SL terminal to receive in a given UL resource, in the event of SL) operates in half-duplex operation. When UL communication is performed in a time interval (subframe) including a given UL resource, UL data can be mapped to radio resources except for the radio resource elements where the given UL resource is mapped. On the other hand, when DL communication is performed in a time interval (subframe) including a given UL resource, in the OFDM symbol including the given UL resource and in OFDM symbols where a gap period or a guard period is provided, the base station (or in the event of SL, an SL terminal that receives in a given UL resource) does not map the DL data to all the subcarriers of the same carrier (a carrier configured to perform DL communication in a time interval including a given UL resource). The gap period or the guard period is provided in OFDM symbols before and after the OFDM symbol to which the given UL resource is allocated.

Note that, in the time interval (subframe) including the given UL resource, the user terminal receiving DL data may decode based on the assumption that DL data is rate-matched in consideration of the UL resource, or decode based on the assumption that the DL data is punctured. When rate matching is executed, it is possible to avoid performance degradation due to the inability to map DL data. When puncturing is executed, common coding control can be applied between subframes including the given UL resource and subframes not including the given UL resource, so that the burden of control on the terminal can be reduced.

FIGS. 6D to 6F show an example in which the base station (or an SL terminal to receive in a given UL resource, in the event of SL) is in full-duplex operation. When performing UL communication in a time interval (subframe) including a given UL resource, UL data can be mapped to radio resources other than the radio resource elements where the given UL resource is mapped. On the other hand, when DL communication is performed in a time interval (subframe) including a given UL resource, even in OFDM symbols including this UL resource, the base station can map the DL data except for the guard period. The guard period is provided in neighboring subcarriers of a given UL resource, for example, and comprised of one or more subcarriers or one or more resource blocks.

In the time interval including this given UL resource, the user terminal to receive DL data may decode based on the assumption that the DL data is rate-matched in consideration of the UL resource, or may decode based on the assumption that the DL data is punctured. When rate matching is performed, it is possible to avoid performance degradation due to the inability to map DL data. When puncturing is performed, a common coding control can be applied between subframes including the given UL resource and subframes not including the given UL resource, so that the burden of control on the terminal can be reduced.

In the present embodiment, as shown in FIG. 7A, a given UL resource is configured for given UL signal transmission to the user terminal. The given UL signal refers to a UL signal other than UL signal scheduled aperiodically with physical layer signaling, such as, for example, random access preambles, scheduling request signals (SR), CSI feedback, HARQ-ACK feedback, sounding reference signals (SRS), or reference signals for beam measurement (UL BRS, or BRRS), for example, data and reference signals used for demodulation of that data, and aperiodic SRS.

Based on radio parameters, commands from the base station and so on, the user terminal identify the time interval duration (for example, a subframe duration) and its timing for data communication as shown in FIG. 7B. As the radio parameter, a subcarrier spacing used for data communication may be included. The radio parameter may be 1 [ms] or 0.5 [ms] when the subcarrier spacing is 15 [kHz] and may be 0.5 [ms] or 0.25 [ms] when the subcarrier spacing is 30 [kHz].

The length of the time interval (subframe) and the starting timing (that is, the boundary between adjacent time intervals) may be provided independently of the periodicity of configuring UL resources for given UL signal transmission. The time interval (subframe) may be changed by RRC, MAC or physical layer signaling. FIG. 8A is a diagram to show an example in which the time interval has been changed from time interval "a" to time interval "b." For example, the time interval a may be a long TTI, and the time interval b may be a shortened TTI.

The time interval (subframe) may be different for each partial band (subband) in which DL data or UL data is scheduled, or for each partial band (subband) to which scheduling control information is mapped, in the system band. FIG. 8B is a diagram to show an example in which the time interval changes between time interval a and time interval b for each partial band (subband), in the system band. For example, the time interval a may be a long TTI and the time interval b may be a shortened TTI.

The time interval (subframe) may be different between the time interval (subframe) for DL communication and the time interval (subframe) for UL communication. FIG. 8C is a diagram to show an example in which the time interval for DL communication is different from the time interval for UL communication. In the example shown in FIG. 8C, the length of the time interval for UL communication is about twice the length of the time interval for DL communication.

The UL resource for a given UL signal transmission may be changed by RRC, MAC or physical layer signaling. FIG. 9A is a diagram to show an example in which the UL resource for a given UL signal has been changed and increased in some time intervals (subframe).

The UL signal transmitted in a given UL resource may be a signal that is transmitted when a given condition is satisfied. FIG. 9B is a diagram to show an example in which the UL signal is not transmitted with a given UL resource because a given condition is not fulfilled. Even when no UL signal is transmitted, the given UL resource is reserved. That is, DL data or UL data is not mapped to the given UL resource regardless of whether or not transmission takes place.

Given conditions in the example shown in FIG. 9B are explained. When the given UL signal is the transmission resource of the random access preamble, a case of UL asynchronous (that is, timeAlignmentTimer has expired), a case where there is UL data to be transmitted but there is no scheduling request signal resource, a case where command is issued by physical layer signaling from the base station, and the like may be set as given conditions. When the given UL signal is the transmission resource for a scheduling request signal, a case where there is UL data to be transmitted, and so on may be set as a given condition. When the given UL signal is a transmission resource of the HARQ-ACK feedback, a case where there is HARQ-ACK feedback information corresponding to DL data, and so on may be set as the given condition. When the given UL signal is a transmission resource of CSI feedback, a case where there is CSI report information measured based on a DL reference signal such as CSI-RS, and so on may be set as a given condition. When the given UL signal is a sounding reference signal or a beam measurement reference signal (BRS or BRRS), a case where transmission is commanded from the base station, and so on may be set as a given condition.

Regardless of whether a given UL resource is included in the time interval (subframe) or not, when DL data or UL data is scheduled in this time interval, the user terminal transmits and receives signals scheduled for the time interval.

When UL data is scheduled in the time interval (subframe), the user terminal maps the scheduled UL data to the radio resource excluding the radio resource elements where the given UL resource is mapped and performs transmission.

When DL data is scheduled in the time interval (subframe), the user terminal assumes that scheduled DL data is mapped to radio resources excluding the radio resource elements where a given UL resource is mapped and part of their surrounding e resource elements, and performs receipt.

A mapping rule of DL data and its transmission/receipt operation in a time interval (subframe) including a given UL resource may be different depending on whether the base station (or an SL terminal that performs receipt in a given UL resource, in the event of SL) operates in half-duplex operation or in full-duplex operation. When the base station (or an SL terminal that performs receipt in a given UL resource, in the event of SL) operates in half-duplex operation, in an OFDM symbol including a given UL resource, rule or operation to receive on the assumption that the DL data is not mapped to all subcarriers of the same carrier, may be applied (see FIGS. 6A to 6C). When the base station (or an SL terminal to receive in a given UL resource, in the event of SL) operates in full-duplex operation, even in an OFDM symbol including a given UL resource, rules or operations to receive on the assumption that the DL data is mapped excluding the adjacent subcarriers of the given UL resource, may be applied (see FIGS. 6D to 6F).

In each time interval (subframe), whether the DL data or the UL data is scheduled may be reported from the base station to the user terminal via higher layer or physical layer signaling.

Whether the base station operates in half-duplex operation or in full-duplex operation may be separately reported to the user terminal by higher layer signaling and so on. In the absence of a report in particular, the user terminal may receive the DL data based on the assumption that the base station operates in half-duplex operation.

When it is assumed that the base station operates in half-duplex operation, and performs receipt assuming that DL data is mapped in a time interval (subframe) including a given UL resource, that is, in the cases shown in FIGS. 6A to 6C, the user terminal can perform transmission in a given UL resource included in this time interval. In this case, data transmission is performed in an arbitrary communication direction, transmission can be performed in the given UL resource, so that latency caused by UL communication can be reduced.

When it is assumed that the base station operates in full-duplex operation, and the receipt will be performed assuming that the DL data is mapped in the time interval (subframe) including the given UL resource, that is, in the case shown in FIG. 6D to 6F, the user terminal may drop the transmission with the given UL resource included in this time interval, or skip receiving some DL data included in the OFDM symbol where a given UL resource is configured. FIGS. 10A to 10C are diagrams to show examples in which the transmission of the UL signal is dropped. FIGS. 10D to 10F are diagrams to show examples in which receipt of DL signals is skipped. FIGS. 10A and 10D are examples in which a given UL resource is included in an OFDM symbol located early in the time interval (subframe), FIGS. 10B and 10E are examples in which a given UL resource is included in an OFDM symbol located in the center of the time interval (subframe), FIGS. 10C and 10F are examples in which a given UL resource is included in an OFDM symbol located late in the time interval (subframe).

As shown in FIGS. 10A to 10C, the user terminal may be configured not to transmit in this UL resource (dropping), when DL data receipt is scheduled in the time interval (subframe) including a given UL resource. In this case, it is possible to ensure the received quality of the DL data and suppress an increase in the error rate of the DL data.

From FIGS. 10D to 10F, when DL data receipt is scheduled in a time interval (subframe) including a given UL resource, since the user terminal transmits the UL signal in this given UL resource, the user terminal may be configured not to receive the DL signal (skipping) in the OFDM symbol including the given UL resource and its adjacent OFDM symbols. In this case, since it is not necessary to delay the UL transmission with the given UL resource, the UL latency can be reduced.

According to the second aspect, when a given UL resource is configured for given UL signal transmission in a user terminal, radio resources in the time interval (subframe) including this given UL resource can be flexibly used for DL data communication, UL data communication or SL data communication. Therefore, the time interval (subframe) including the given UL resource can be used for data communication in an arbitrary communication direction including DL, UL or SL.

(Structure of Radio Communication System)

Now, the structure of the radio communication system according to one embodiment of the present invention will be described below. In this radio communication system, communication is performed using one or a combination of the radio communication methods according to the above aspects of the present invention.

Figure 11:
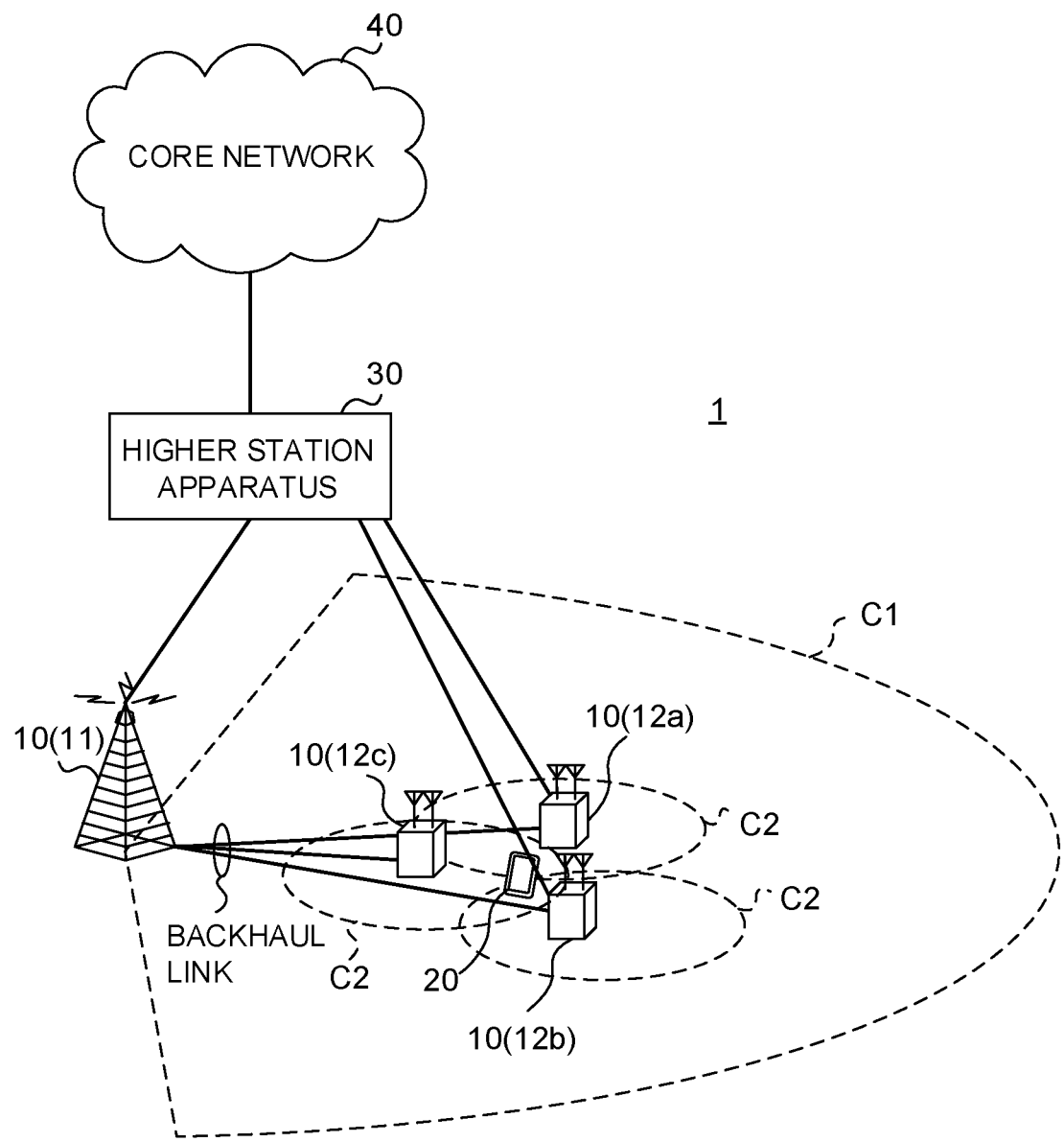
FIG. 11 is a diagram to show an example of a schematic structure of a radio communication system according to one embodiment of the present invention.

FIG. 11 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 shown in FIG. 11 includes a radio base station 11 that forms a macro cell C1, and radio base stations 12 (12a to 12c) that form small cells C2, which are placed within the macro cell C1 and which are narrower than the macro cell C1. Furthermore, in the macro cell C1 and the small cell C2, the user terminal 20 is arranged.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bandwidths formed with one or continuous resource blocks per terminal, and allowing a plurality of terminals to use mutually different bandwidths. Note that the uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 12:
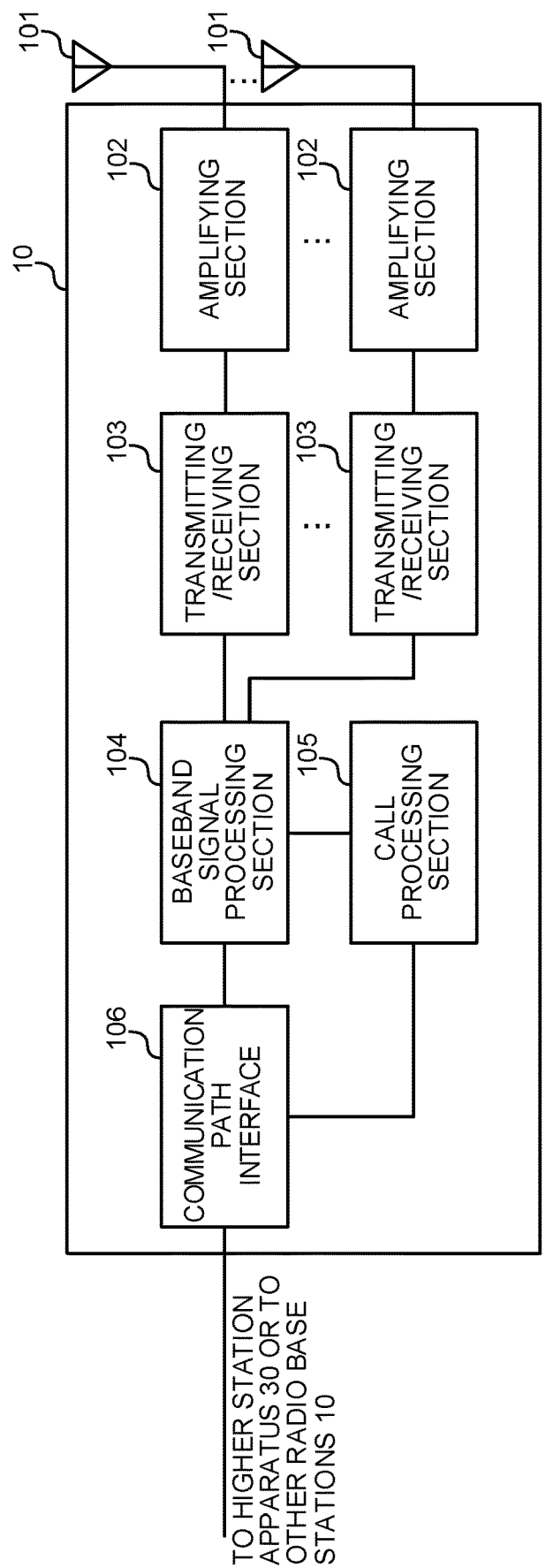
FIG. 12 is a diagram to show an example of an overall structure of a radio base station according to one embodiment of the present invention.

FIG. 12 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signal to be transmitted to user terminals (for example, downlink control information, downlink data, etc.). The transmitting/receiving sections 103 can include information that specifies between UL communication (for example, schedule of UL data) and DL communication (for example, schedule of DL data), in downlink control information, and transmit this to the user terminal.

Figure 13:
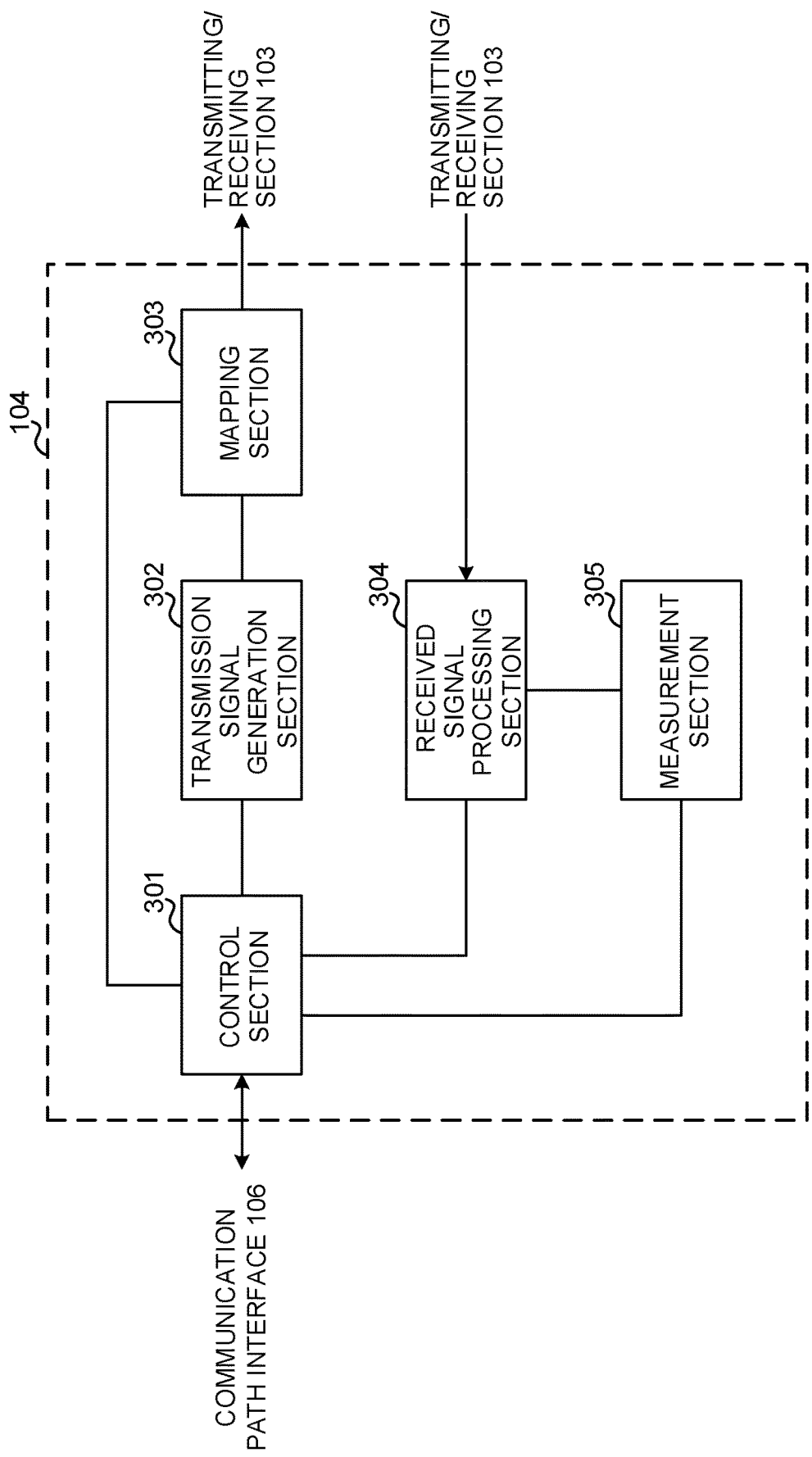
FIG. 13 is a diagram to show an example of a functional structure of a radio base station according to one embodiment of the present invention.

FIG. 13 is a diagram to show an example of a functional structure of a radio base station according to one embodiment of the present invention. Note that, although FIG. 10 primarily shows functional blocks that pertain to characteristic parts of the present embodiment, the radio base station 10 has other functional blocks that are necessary for radio communication as well. As shown in FIG. 13, the baseband signal processing section 104 has a control section (scheduler) 301, a transmission signal generation section 302, a mapping section 303, a received signal processing section 304 and a measurement section 305.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and/or downlink control signals that are communicated in the PDCCH and/or the EPDCCH. Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

Also, the control section 301 controls the scheduling of uplink data signals transmitted in the PUSCH, uplink control signals transmitted in the PUCCH and/or the PUSCH (for example, delivery acknowledgement signals), random access preambles transmitted in the PRACH, uplink reference signals and so on.

The control section 301 can control communication by dynamically switching UL communication and DL communication for each subframe and/or within subframes.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

(User Terminal)

Figure 14:
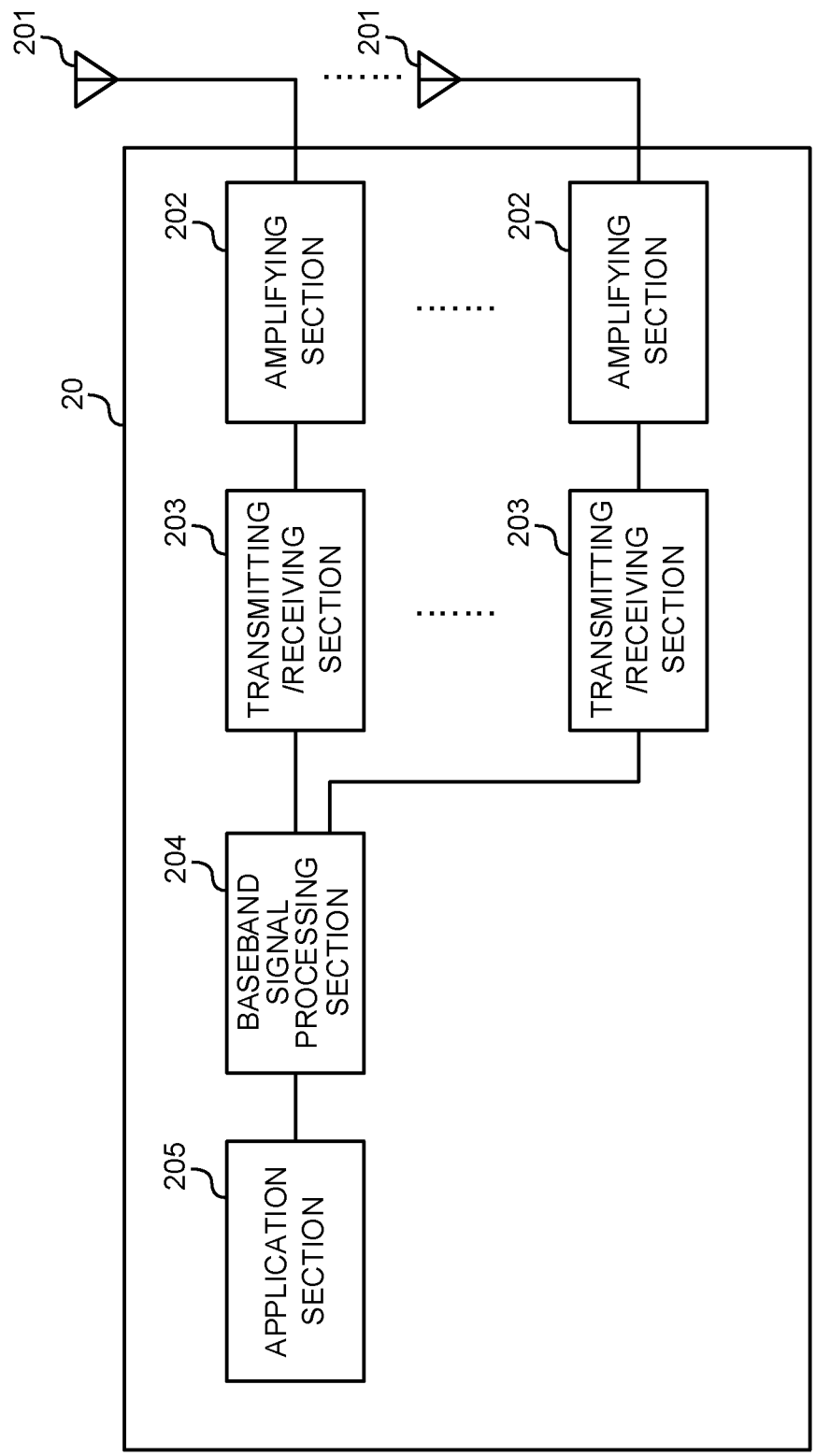
FIG. 14 is a diagram to show an example of an overall structure of a user terminal according to one embodiment of the present invention.

FIG. 14 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals and transmit UL signals. For example, the transmitting/receiving sections 203 receive downlink control information transmitted from the radio base station. In addition, based on the downlink control information, the transmitting/receiving sections 203 perform transmission and receipt by dynamically switching between UL communication and DL communication per subframe and/or within a subframe. When UL data is scheduled in a subframe including a given DL signal, the transmitting/receiving sections 203 map the UL signal apart from the radio resource elements where the given DL signal is mapped and part of their surrounding resource elements. When DL data is scheduled in a subframe where a given UL resource is included, the transmitting/receiving sections 203 perform receipt based on the assumption that the DL signal is mapped apart from the radio resource elements where the given UL resource is mapped and part of their surrounding resource elements.

Figure 15:
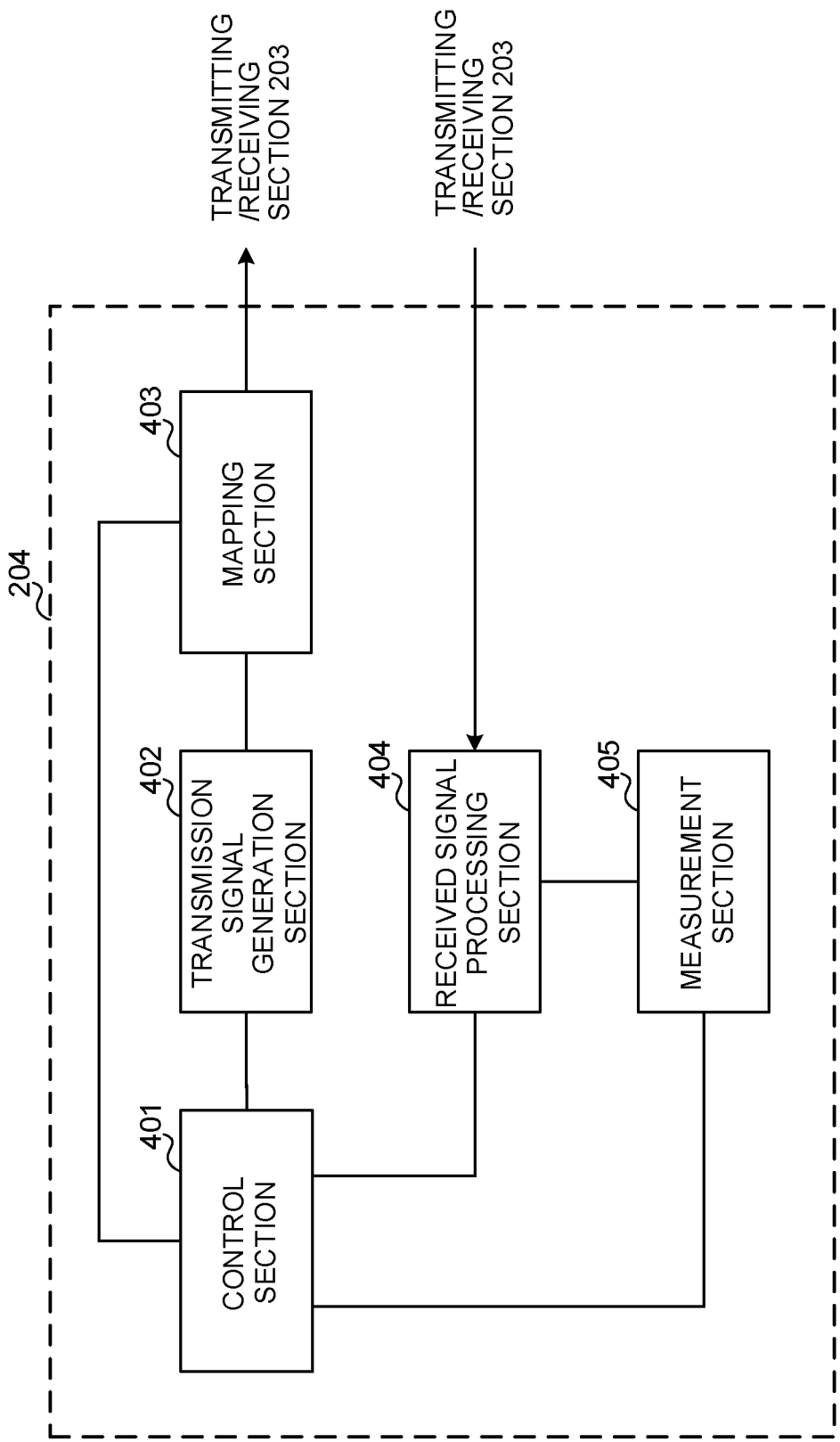
FIG. 15 is a diagram to show an example of a functional structure of a user terminal according to one embodiment of the present invention.

FIG. 15 is a diagram to show an example of a functional structure of a user terminal according to one embodiment of the present invention. Note that, although FIG. 15 primarily shows functional blocks that pertain to characteristic parts of the present embodiment, the user terminal 20 has other functional blocks that are necessary for radio communication as well. As shown in FIG. 15, the baseband signal processing section 204 provided in the user terminal 20 at least has a control section 401, a transmission signal generation section 402, a mapping section 403, a received signal processing section 404 and a judgment section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the decision section 405, and so on.

For example, the control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The control section 401 controls communication by dynamically switching between UL communication and DL communication per subframe and/or within subframes, based on downlink control information. For example, when UL data is scheduled in a subframe including a given DL signal, the control section 401 exerts control so that the UL signal is mapped apart from the radio resource elements where the given DL signal is mapped and part of their surrounding resource elements, and transmitted (see FIG. 2). When DL data is scheduled in a subframe including a given UL resource, the control section 401 exerts control so that receipt is performed based on the assumption that the DL signal is mapped apart from the radio resource elements where the given UL resource is mapped and part of their surrounding resource elements (see FIG. 6).

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generating section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs the receiving processes (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401 and the decision section 405. The received signal processing section 404 outputs, for example, broadcast information, system information, RRC signaling, DCI and so on, to the control section 401.

The received signal processing section 404 can be constituted by a signal processor, a signal processing circuit or signal processing apparatus, and a measurer, a measurement circuit or measurement apparatus that can be described based on general understanding of the technical field, in which the present invention pertains. Also, the received signal processing section 404 can constitute the receiving section according to the present invention.

The decision section 405 makes retransmission control decisions (ACKs/NACKs) based on the decoding results in the receiving process section 404, and, furthermore, outputs the results to the control section 401. When downlink signals (PDSCHs) are transmitted from multiple CCs (for example, six or more CCs), retransmission control decisions (ACKs/NACKs) can be made on a per CC basis, and output to the control section 401. The decision section 405 can be constituted by a decision circuit or decision apparatus that can be described based on general understanding of the technical field pertaining to the present invention.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 16:
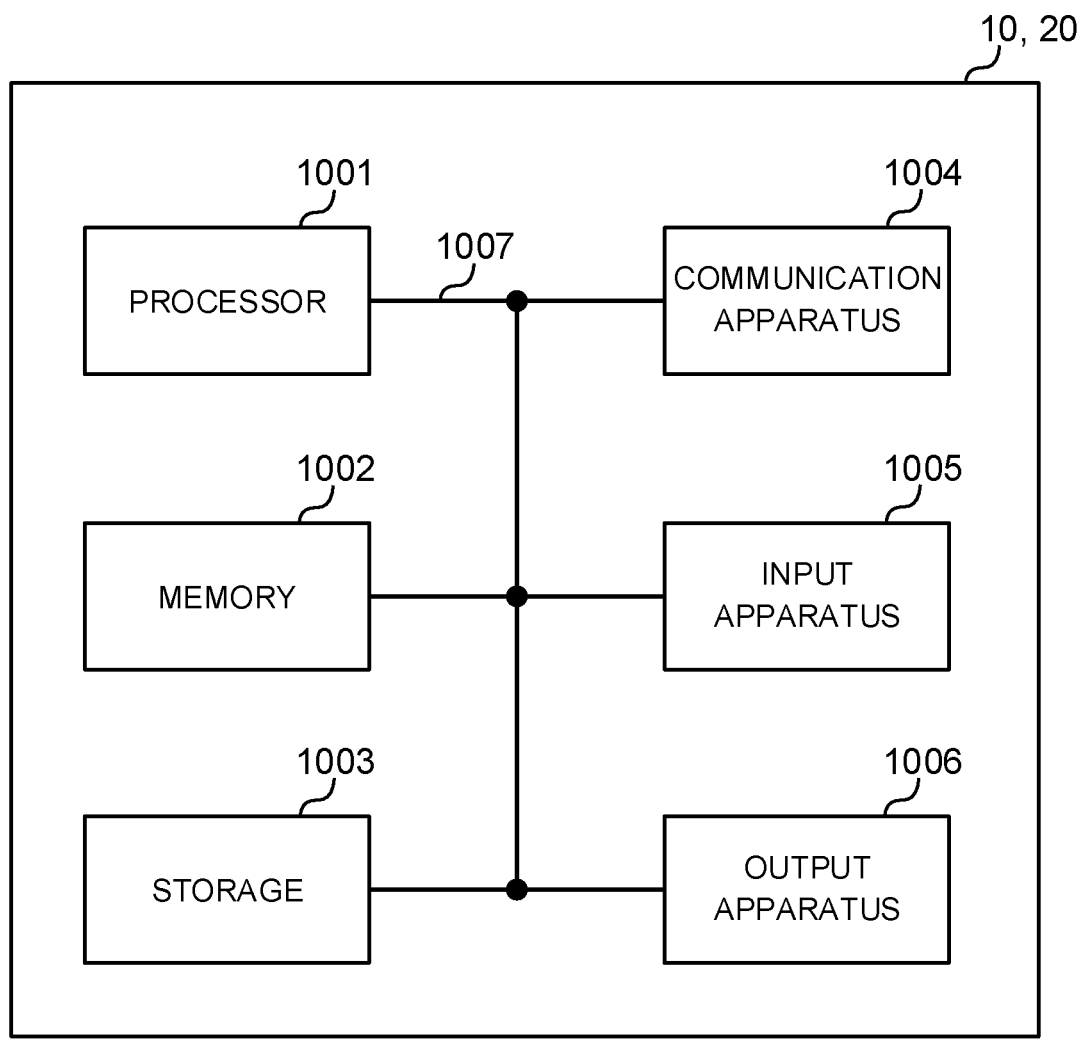
FIG. 16 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 16 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing given software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," a plurality of consecutive subframes may be referred to as a "TTI," or one slot may be referred to as a "TTI." That is, a subframe and a TTI may be a subframe (one ms) in existing LTE, may be a shorter period than one ms (for example, one to thirteen symbols), or may be a longer period of time than one ms.

Here, TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," or the like.

Furthermore, a resource block may be comprised of one or more resource elements (REs). For example, one RE may be a radio resource field of one subcarrier and one symbol.

Note that the structures of radio frames, subframes, slots, symbols and the like described above are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to given values, or may be represented in other information formats. For example, radio resources may be specified by a given index. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

As used herein, the terms "system" and "network" are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

The base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, wording such as "uplink" and "downlink" may be interpreted as "side." For example, the uplink channel may be interpreted as "side channel."

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-116668, filed on Jun. 10, 2016, including the specification, drawings and abstract, is incorporated herein by reference in its entirety.

The invention claimed is:

1. A terminal comprising:
a receiver that receives, by higher layer signaling, information indicating symbols of a downlink signal, including a synchronization signal and a physical broadcast channel (PBCH); and
a processor that does not perform transmission of an uplink data in the symbols when a time interval, in which the uplink data is scheduled, overlaps the symbols,
wherein, if half-duplex communication is performed, the processor does not perform the uplink data transmission in a predetermined time after the downlink signal.

2. The terminal according to claim 1, wherein the receiver receives information indicating a periodicity of the downlink signal.

3. A radio communication method for a terminal comprising:
receiving, by higher layer signaling, information indicating symbols of a downlink signal, including a synchronization signal and a physical broadcast channel (PBCH); and
not performing transmission of an uplink data in the symbols when a time interval, in which the uplink data is scheduled, overlaps the symbols,
wherein, if half-duplex communication is performed, the terminal does not perform the uplink data transmission in a predetermined time after the downlink signal.

4. A base station comprising:
a transmitter that transmits, by higher layer signaling, information indicating symbols of a downlink signal, including a synchronization signal and a physical broadcast channel (PBCH); and
a receiver that does not perform reception of an uplink data in the symbols when a time interval, in which the uplink data is scheduled, overlaps the symbols,
wherein, if half-duplex communication is performed, the uplink data reception is not performed in a predetermined time after the downlink signal.

5. A system comprising a base station and a terminal, wherein:
the base station comprises:
a transmitter that transmits, by higher layer signaling, information indicating symbols of a downlink signal, including a synchronization signal and a physical broadcast channel (PBCH);
the terminal comprises:
a receiver that receives, by higher layer signaling, the information indicating the symbols of the downlink signal, including the synchronization signal and the PBCH; and
a processor that does not perform transmission of an uplink data in the symbols when a time interval, in which the uplink data is scheduled, overlaps the symbols,
wherein, if half-duplex communication is performed, the processor does not perform the uplink data transmission in a predetermined time after the downlink signal.

* * * * *